Jan. 8, 1935.     C. M. ROSE     1,987,351

SEAL LOCK

Filed Dec. 22, 1933

Inventor
Chester M. Rose

By W. S. McDowell

Attorney

Patented Jan. 8, 1935

1,987,351

UNITED STATES PATENT OFFICE 1,987,351

SEAL LOCK

Chester M. Rose, Columbus, Ohio

Application December 22, 1933, Serial No. 703,576

5 Claims. (Cl. 292—328)

This invention relates to improvements in seal locks and has particular reference to the type in which a shackle interlocks with a casing in such a manner that a complete or partial destruction of a part of the seal is required in order to open the seal structure.

It is a primary object of the present invention to provide a seal lock or fastening which is formed to comprise a casing formed from two interfitting box-shaped metallic sections placed one within the other and provided in the edge flanges thereof with registering openings adapted for the reception of the legs of the shackle, whereby when the fastening is in operative relationship, separation of the casing sections will be prevented by the shackle and the use of fastening devices, such as rivets or the like, heretofore employed in securing casing sections together, will be eliminated.

It is a further object of the invention to provide a seal lock wherein the casing sections when in interfitting relationship form a spring compartment formed for the reception of a spring member which includes a pair of resilient legs, the free ends of the latter being positioned to cooperate with notches or teeth provided in the spaced vertical edges of the shackle, whereby when the latter is inserted within the casing, the legs of the spring member engage with said notches to prevent the withdrawal of the shackle without first mutilating or damaging the structure.

It is a further object of the invention to provide a seal fastener of an efficient and effective character in the various uses to which it may be placed and one which will consist of but a minimum number of parts so that it may be manufactured in large quantities at low cost.

The invention consists of certain parts and combinations of parts, all of which will be hereinafter described and more particularly pointed out in the appended claims.

Figure 3:
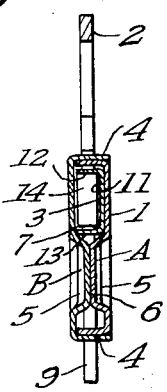
Fig. 3 is a transverse vertical sectional view on the plane indicated by the line III—III of Fig. 2.

Referring more particularly to the drawing, my improved seal lock comprises but four parts, there being a casing 1, which is composed of two parts, a shackle 2 and a spring fastener 3. The casing is formed of two relatively inverted box-shaped inner and outer metal sections A and B respectively, which are die-pressed from suitable blanks of sheet metal to produce relatively widened interfitting marginal flanges 4 and perpendicular side walls 5. As shown in Fig. 3, the side walls 5 are depressed as at 6 to engage with one another and the formation of this compressed portion of the casing sections is such as to produce a spring chamber 7 in the upper central portion of the casing in which is positioned for secure retention the spring fastener 3. The flanges 4 of the casing have formed in their upper and lower longitudinal portions vertically registering openings 8 through which pass the spaced vertical legs 9 of the shackle 2. The shackle is formed from flat relatively thin strips of metal stamped into U form, and I preferably form the shackle from an aluminum alloy, although other suitable metals may be utilized. It will be noted that the legs of the shackle project entirely through the casing and terminate, when the shackle is operatively inserted, well below the lower portion of the casing. The inner vertical edges of the legs 9 of the shackle are notched to produce horizontally aligned wedge-shaped recesses 10 which are adapted for locking cooperation with the fastener 3.

Figure 6:
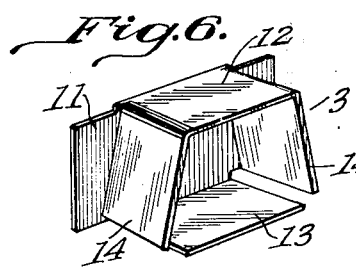
Fig. 6 is a perspective view of the locking spring.

The fastener 3 is also formed from a sheet metal stamping and, as shown in Fig. 6, comprises an integral piece of spring metal shaped to form a back plate 11, forwardly and horizontally positioned top and bottom plates 12 and 13 respectively and outwardly and downwardly inclined resilient arms 14 which depend integrally from the side edges of the top plate 12 and are capable of flexing movement independently of the remaining portions of the fastener 3. By this configuration of the fastener, it is readily receivable within the chamber 7 of the casing when the two sections of the latter are assembled and movement of the fastener will be prevented within said chamber by the fact that the back wall 11 and the top and bottom walls 12 and 13 closely engage with the corresponding walls of the chamber 7. Sufficient room is present in the chamber, however, to permit of the desired resilient flexing of the arms 14.

Figure 4:
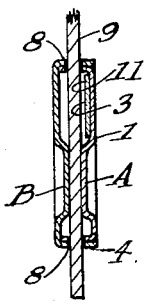
Fig. 4 is a similar view on the plane indicated by the line IV—IV of Fig. 2.
Figure 1:
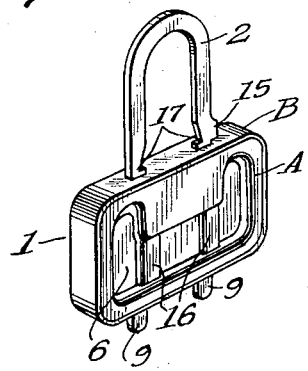
Fig. 1 is a perspective view of a seal lock constructed in accordance with the present invention.
Figure 2:
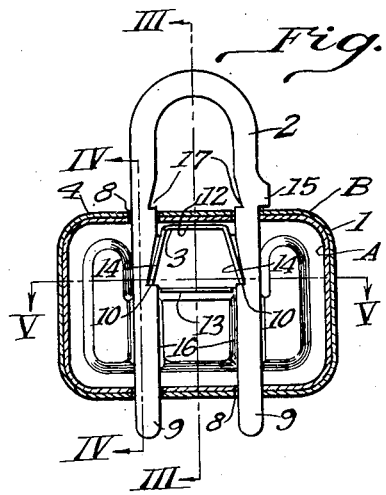
Fig. 2 is a vertical sectional view taken through the casing of the lock and showing the shackle in applied position in connection therewith.
Figure 5:
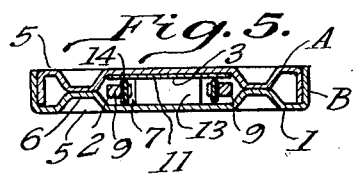
Fig. 5 is a horizontal sectional view on the plane indicated by the line V—V of Fig. 2.

In operation, the spring member or fastener 3 is first positioned in the chamber portion 7 of the metal section A of the casing, and the metal section A is then telescoped in close tight fitting relation within the section B. The marginal flanges 4 of the casing sections closely interfit in a frictional manner so that when the casing sections are assembled, their operative order, as well as that of the spring fastener 3, is maintained even though these parts be subjected to some degree of rough handling. In fact, it would take the use of a sharp edged tool to effect their separation even though the shackle 2 were not connected therewith. In use, however, the legs of the shackle 2 are inserted through the aligned openings 8 in a manner to project entirely through the casing, the insertive movement of the shackle being limited by a shoulder 15 formed in connection therewith. This shoulder contacts with the upper edge of the casing and registers thereby the notches or recesses 10 with the lower ends of the spring arms 14. The latter then flex outwardly, as shown in Fig. 2, so that their lower ends engage with the horizontally shouldered portions of the recesses 10, preventing effectually the removal of the shackle. As shown in Figs. 1 and 4, the casing sections A and B include registering vertical guides 16 for the reception of shackle legs 9. To remove the shackle, after it is locked in connection with the casing, the legs of the shackle above the casing are notched or weakened as at 17, so that the shackle may be broken at this point when it is desired to remove the seal. This permits the legs remaining in the casing to be withdrawn from the bottom and allows the casing of the shackle to be again re-used with a new shackle.

In view of the foregoing, it will be seen that the present invention provides a simple, inexpensive and efficient seal lock which cannot be removed from a locking position without first requiring the destroying or mutilation of an essential part thereof, so that the fact of such removal may be readily apparent. The guide openings 8 closely conform to the configuration and size of the cross sectional formation of the legs of the shackle bolt so that it is impossible to insert a wire or other member into the lock casing to flex the spring arms 14 to releasing positions. The seal has the advantage of being constructed from but a minimum number of parts and entirely eliminates the rivets and other fasteners of a like nature employed in prior types of seal locks of the shackle-casing type.

What is claimed is:

1. A seal lock comprising a casing formed of two relatively inverted box-shaped metal sections having marginal flanges arranged in telescoping relation, said flanges being provided in the top and bottom thereof with registering openings, a shackle provided with spaced legs positioned in said openings and passing entirely through the casing, said casing contiguous to the inner edges of said shackle legs being provided with a spring chamber located in the center of the casing, and a spring member positioned in said chamber without direct connection with the walls of the casing section, said spring member being provided with a pair of resilient arms arranged for engagement with shoulders provided in connection with the side edges of the shackle legs, whereby to retain the shackle in secured relationship with said casing.

2. A seal lock composed of but four pieces and comprising a stamped sheet metal casing consisting of a pair of interfitting sections, the upper and lower edges of said sections being provided with a pair of spaced aligned openings, a U-shaped shackle having the legs thereof formed to be passed through said openings and completely through said casing to preclude separation of said casing sections when said shackle occupies an operative position with respect thereto, and a spring member provided with a pair of flexible arms freely removably seated within the confines of the middle portion of said casing sections, the said arms being adapted for engagement with shoulders formed in connection with the inner edges of the shackle legs.

3. In a seal lock, a casing, a shackle of frangible material formed to provide spaced legs arranged to be received within said casing, spring means provided in said casing and cooperative with shoulders formed in connection with said legs to fasten said shackle within the casing, the legs of said shackle being of reduced cross sectional area at positions beyond the confines of said casing to facilitate the breaking of the shackle to effect its removal from the casing, and a shoulder formed with said shackle opposite a point of reduced cross-sectional area and engageable with said casing to limit the insertive movement of the legs of the shackle into the casing.

4. As a new article of manufacture, a shackle for seal locks comprising a substantially U-shaped metallic member of frangible composition, the said shackle including spaced legs provided along their inner edges with recesses for cooperation with locking means of an associated lock casing, said legs above said recess being of reduced cross sectional area to weaken the shackle at local points to facilitate breaking thereof at such points, and a shoulder integrally formed with at least one of the legs of said shackle opposite a point of reduced cross-sectional area to limit the insertive movement thereof into the lock casing.

5. A seal lock comprising a pair of interfitting sheet metal casing members provided with spaced aligned openings in the upper and lower edges thereof, a shackle of frangible composition formed to include spaced legs arranged to pass through said openings and to unite the casing sections against relative separation, said casing sections between the legs of said shackle being formed to provide a spring chamber, and a spring member arranged to occupy said chamber, said spring member comprising a back plate, laterally projecting horizontally disposed top and bottom plates and a pair of downwardly diverging resilient arms integrally formed with and extending from the top plate, the free ends of said arms being disposed for engagement with shoulders provided in connection with the legs of said shackle to prevent the withdrawal of the latter from the casing following engagement with said spring arms.

CHESTER M. ROSE.